United States Patent
Serocki et al.

(10) Patent No.: US 8,875,347 B2
(45) Date of Patent: Nov. 4, 2014

(54) HINGE EMPLOYING A RATCHET FOR AN UPHOLSTERY SEAT

(71) Applicants: Philip J. Serocki, Sparta, TN (US); Samuel D. Dwello, Casselberry, FL (US)

(72) Inventors: Philip J. Serocki, Sparta, TN (US); Samuel D. Dwello, Casselberry, FL (US)

(73) Assignee: Taco Metals; Inc., Miami, FL (US)

( * ) Notice: Subject to any disclaimer, the term of this patent is extended or adjusted under 35 U.S.C. 154(b) by 0 days.

(21) Appl. No.: 14/138,435

(22) Filed: Dec. 23, 2013

(65) Prior Publication Data

US 2014/0173850 A1    Jun. 26, 2014

Related U.S. Application Data

(60) Provisional application No. 61/740,615, filed on Dec. 21, 2012.

(51) Int. Cl.
*E05D 11/10* (2006.01)
*B60N 2/235* (2006.01)

(52) U.S. Cl.
CPC .................................. *B60N 2/2352* (2013.01)
USPC ............. 16/324; 16/354; 297/366; 297/367 R

(58) Field of Classification Search
CPC .. E05D 3/122; E05D 11/1007; B60N 2/2213; B60N 2/2251; B60N 2/235; B60N 2/2352; B60N 2/2356

USPC ............ 16/239, 324, 325, 354; 297/362, 366, 297/367 R, 368, 369

See application file for complete search history.

(56) References Cited

U.S. PATENT DOCUMENTS

| | | | |
|---|---|---|---|
| 3,710,418 A * | 1/1973 | Kratzer ............................ | 16/325 |
| 3,953,069 A * | 4/1976 | Tamura et al. ............. | 297/367 R |
| 4,295,682 A * | 10/1981 | Kluting et al. ............ | 297/367 R |
| 4,384,744 A * | 5/1983 | Barley ....................... | 297/367 R |
| 4,657,303 A * | 4/1987 | Croft ............................ | 297/362 |
| 4,836,608 A * | 6/1989 | Sugiyama ................. | 297/367 R |
| 5,322,346 A * | 6/1994 | Notta et al. ................ | 297/367 R |
| 6,085,386 A * | 7/2000 | Blanchard et al. .............. | 16/325 |
| 6,120,098 A * | 9/2000 | Magyar et al. ............ | 297/367 R |
| 6,328,382 B1 * | 12/2001 | Yamashita ................. | 297/367 R |
| 7,328,954 B2 * | 2/2008 | Sasaki et al. ............. | 297/378.12 |
| 8,070,231 B2 * | 12/2011 | Kienke et al. ............. | 297/367 R |
| 8,104,141 B2 * | 1/2012 | Yamashita ...................... | 16/239 |

* cited by examiner

*Primary Examiner* — William Miller
(74) *Attorney, Agent, or Firm* — Robert M. Schwartz

(57) ABSTRACT

A hinge and bracket system for a cushion seat back is provided. A bracket is attached to the side of a cushion seat back which is laying flat. The bracket is connected to a rotatable shaft, which in turn is connected to a toothed gear and a pawl. When the cushion seat back is raised upward, the toothed gear and an element of the pawl allow the cushion seat back to ratchet upwards, with the capability to lock the cushion seat back at any tooth. When the cushion seat back is raised above about 90 degrees, the pawl is forced to disengage from the toothed gear and the cushion seat back is unlocked and can be placed back in the original flat position. This hinge and bracket system may be employed in marine operations, especially for water skiing.

2 Claims, 5 Drawing Sheets

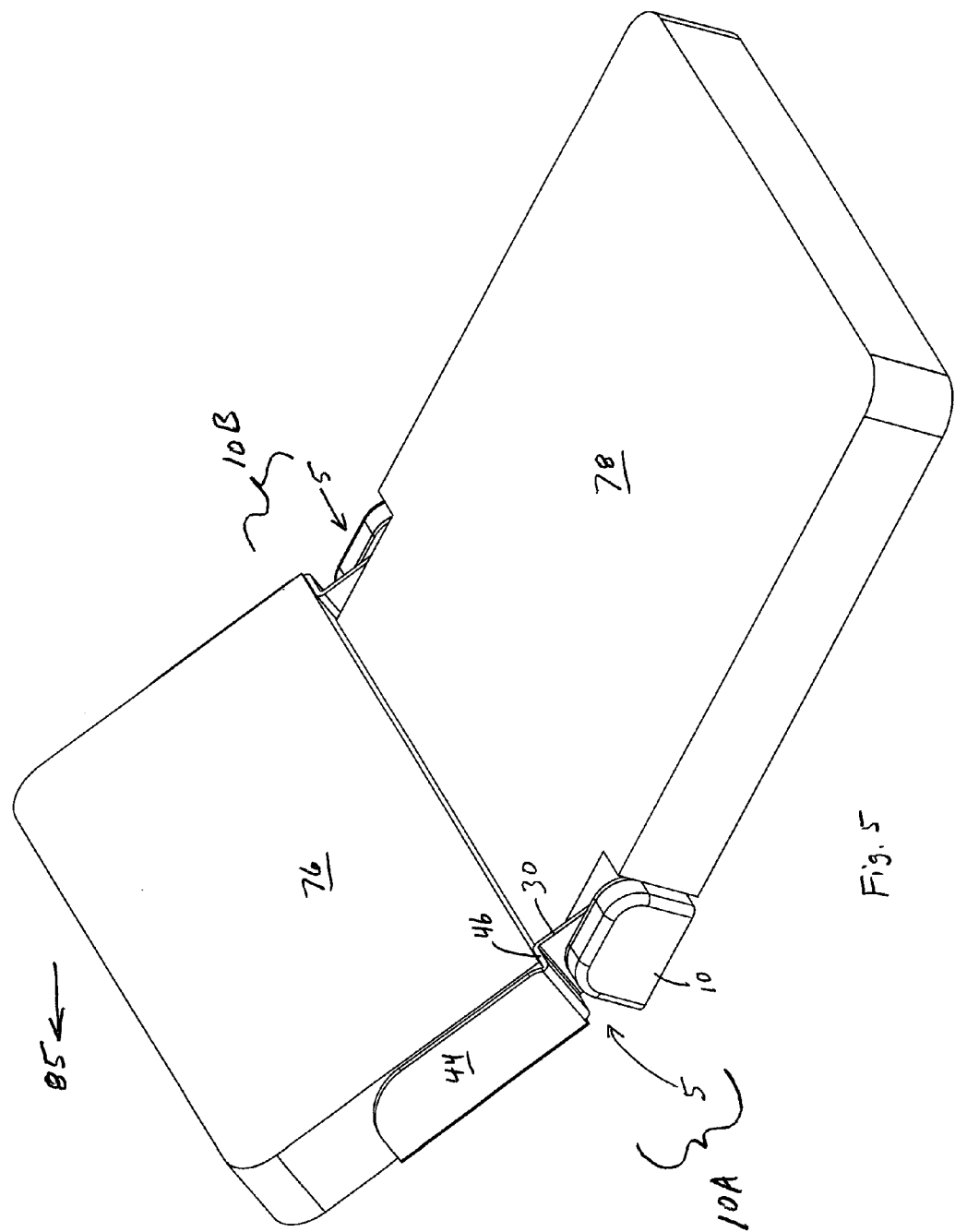

HINGE EMPLOYING A RATCHET FOR AN UPHOLSTERY SEAT

INDEX TO RELATED APPLICATIONS

This application claims the benefit of U.S. Provisional Patent Application Ser. No. 61/740,615 filed on Dec. 21, 2012, entitled Ratchets for Upholstery Seat, the disclosure of which is incorporated herein by reference in its entirety.

BACKGROUND OF THE INVENTION

The present invention is directed to a hinge which includes a ratchet and pawl to permit an element of upholstery to move from a flat zero degree position upwardly to about a 90 to 100 degree position. The element of upholstery being discussed is a cushion that folds up to form a back rest which is provided on the stern of a recreational watercraft. Current designs do not allow for easy adjustment of seat and cushion positions for usage in sunbathing, installing waterski hardware, rear deck lounging.

BRIEF SUMMARY OF THE INVENTION

The present invention is directed to a ratchet mechanism and bracket to be affixed to a cushion seat back on the rear deck of a marine craft, to permit the cushion seat back to be adjusted into one of any of a plurality of positions for the comfort of the user. Although the instant ratchet mechanism is employed in a marine application, it is not limited solely to such an application. The instant structure may be used on any of a plurality of chaise lounge type recliners as well as any other related devices, recliners or seat backs, deck cushions on cruisers, interior lounge seats, and armrests. The disclosed invention is an improved hinge system that can work on or be mounted to any structure that is needed to adjust to various positions. Such structures without limitation could be for a hatch lid for a storage compartment or for an engine rooms.

A toothed gear with a central aperture and a surrounding circular element has a plurality of teeth protruding radially outwardly along the circumference. A shaft is connected to a bracket and is secured in the central aperture of the toothed gear by a locking key. When the toothed gear rotates, the shaft rotates, moving the bracket and thus moving the cushion seat back. A specialized rotatable pawl has a lower toothed portion for interacting with the gear teeth, a central pawl tongue located above the lower tooth portion, and an upper portion which is toothless. Depending on the rotation of the toothed gear, the pawl may lock the cushion seat back in an upright position, or allow the cushion seat back to move freely back to an initial position.

The current invention has a main gear with a plurality of ratchet teeth approximately every seven (7) degrees, which permits the cushion to be locked into a position seven (7) degrees apart from a previous position. Different embodiments of the ratchets for the upholstery seat can change this seven (7) degree separation by changing the number of teeth to be a greater number of a lesser number. The instant ratchet pawl system allows the upholstery which is affixed to the brackets and the spring ratchet pawls system to move upwardly from the deck with the ratchet engaged, moving 7 degrees for each tooth moved forward on the gear teeth until it reaches approximately 97 degrees. At this point the release spring deactivates the ratchet system allowing the upholstery to return to the stern deck, where the spring activates the ratchet system again to allow the upholstery to be ratcheted back up to 97 degrees.

The invention is employed on the port and starboard side of the upholstery chair which permits the upholstery chair to move from a flat position to a locked position. A bracket portion proximal the hinge is secured to the deck to where it retains a fixed upholstery pad secured to the deck.

All of the elements of the invention are made or metal. Stainless steel, while expensive, may have a greater longevity, especially in salt water. In embodiments of the invention which are intended to be used on the land, other metals or even synthetic polymers may be employed.

BRIEF DESCRIPTION OF THE DRAWINGS

FIG. 5 is a perspective view of movable upholstery secured by the spring hinge elements of the invention at an approximate level as that shown in FIG. 3.

DETAILED DESCRIPTION OF THE PREFERRED EMBODIMENT

Figure 1:
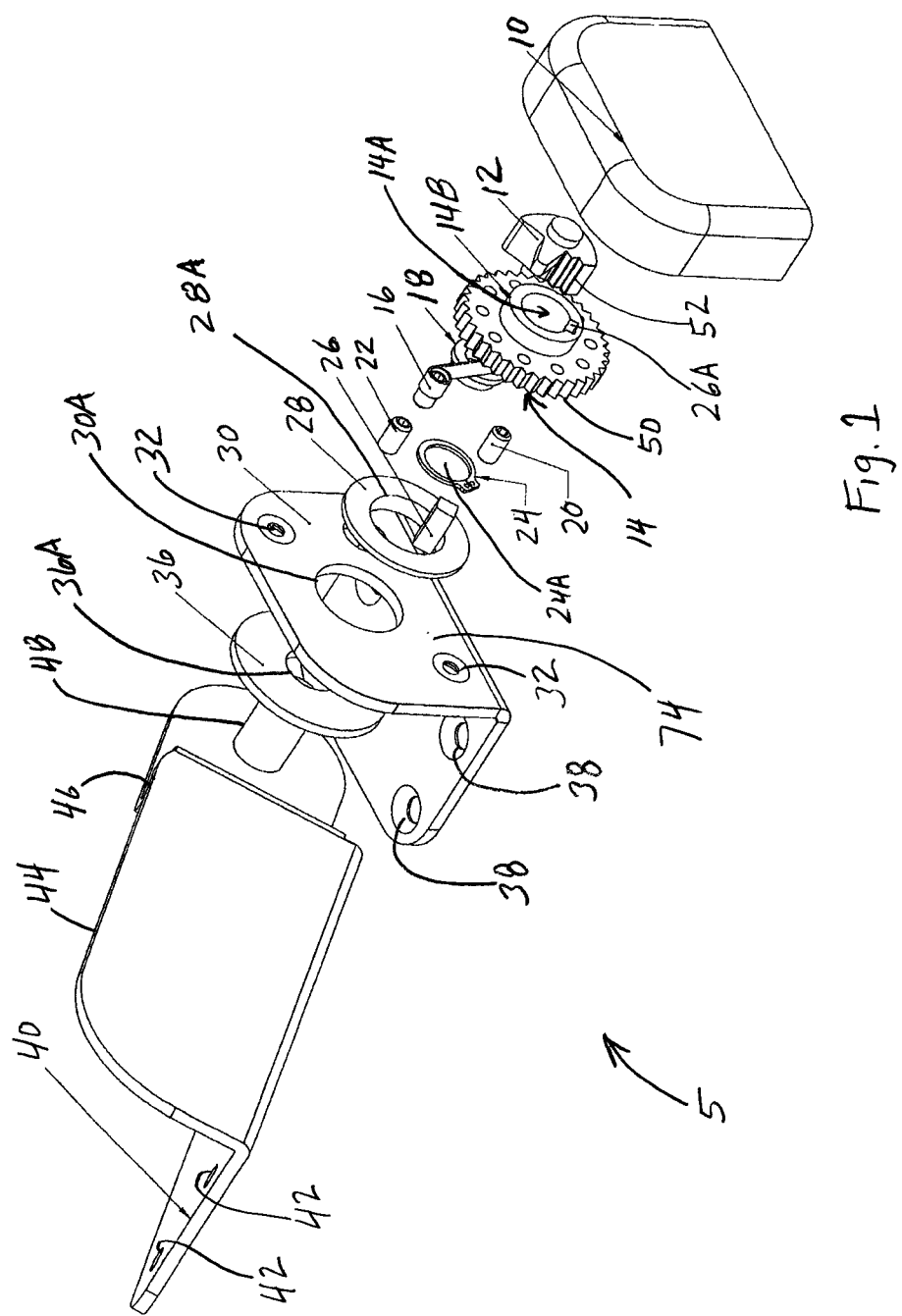
FIG. 1 is an exploded view of the pawl and ratchet spring hinge element of the invention in relation to the multiple brackets.

Referring to FIG. 1, an exploded view of the hinge employing a ratchet mechanism 5 for a movable upholstery seat or seat back 76 (best seen in FIG. 5) is shown. From right to left, a cover 10 is secured to the fixed mount bracket 30. Proximal the interior side of the cover 10 is the pawl 12, the pawl 12 has a first side with teeth 52 and a second side with no teeth 56 as well as a pawl tongue 54 the circular element with a plurality of teeth 50 radially disposed about its circumferential edge, the ratchet spring 16, the first brass bearing 18, the first set screw 20, the second set screw 22, the snap ring 24, the shaft key 26, and the second brass bearing 28. The washer (preferably Delrin® a registered trademark of E.I. Dupont De Nemours and Company, Wilmington, Del.) 36 has a central circular opening 36A. This is immediately adjacent the central circular opening 30A of fixed mount bracket 30. Fixed mount bracket 30 includes a pair of bolt holes 32. The second brass bearing 28 has a central circular opening 28A immediately adjacent the central circular opening 36A. Intermediate the second brass bearing circular opening 28A is the snap ring 24 with a central circular opening 24A. The snap ring 24 with a central circular opening 24A is adjacent to the first brass bearing 18 which has a circular opening (not shown). Shaft 48 inter fits down the cavity formed by the washer central circular opening 36A, the fixed mount bracket circular opening 30A, the second brass bearing central circular opening 36A, through the snap ring central circular opening 24 and through the first brass bearing circular opening and into the main gear central circular opening 14A. A key way 26A is formed parallel to the shaft 48 on the side of the central circular opening 14A. The shaft key 26 fits into the key way 26a securing the shaft to the main gear 14, and thus when the main gear 14 is caused to rotate by action of the pawl tongue 54 with the pawl teeth 52 engaged to the gear teeth 50 of the main gear 14, the cushion support plate 44 is caused to rotate with it. Perpendicular to the cushion support plate 44 is the backrest support 40, which includes a plurality of apertures 42 to secure a upholstery back portion or seat back 76 thereto. Main gear 14 has an annular shoulder 14B. The movement of the pawl teeth 52 against the gear teeth 50 moves the cushion support plate 44 seven degrees. This has the effect of rotating the upholstery back portion or seat back 76 at the same angular distance.

Figure 2:
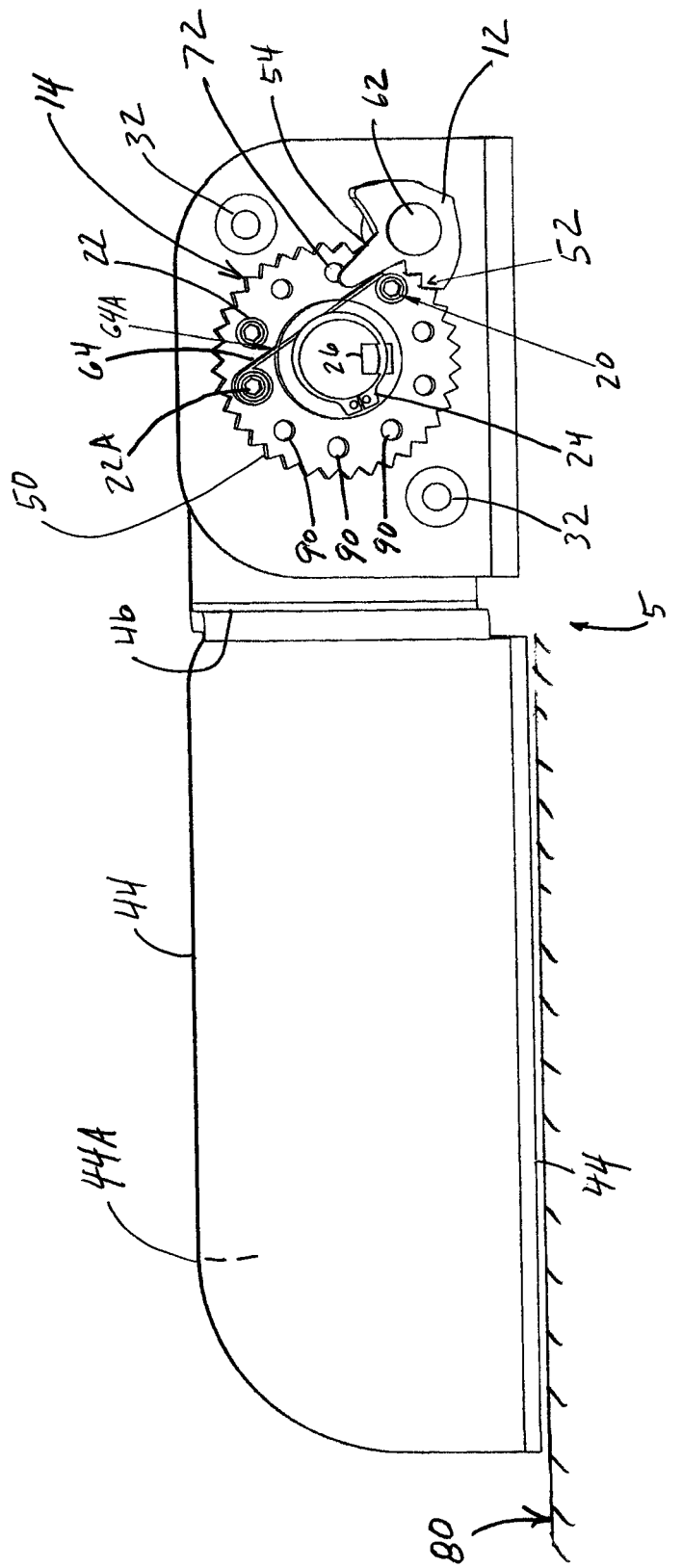
FIG. 2 is a view of the pawl and ratchet spring hinge element of the invention with the brackets shown in such a position so that if the movable upholstery were shown, it would be lying flat against the stern deck.

FIG. 2 is a view of the pawl tongue 54, and ratchet spring hinge element 64 of the invention with the brackets shown in such a position so that if the movable upholstery 76 (see FIG. 5) were shown, it would be lying adjacent the rear of the movable cushion support plate 44 and lying flat against or in close proximity to the stern deck 80. In FIG. 2, the upholstery (adjacent element 44A), would be at a zero angle with respect to the stern deck 80. The ratchet spring hinge element 64 is shown secured about a third set screw 22A with the ratchet spring hinge element extension 64A intermediate the set screw 20 and the pawl tongue 54. Spring extension 64A can rest against annular shoulder 14B. In this position, the lower pawl teeth 52 are shown inter-meshed with a portion of the gear teeth 50 of the main gear 14. A plurality of apertures 90 are located through the main gear 14 at approximately thirty degree intervals. These plurality of apertures 90 are located intermediate the gear teeth 50 and the main gear 14 central aperture 14A. These apertures 90 are designed to receive set screws or other devices therein in a different configuration than the first set screw 20 and the second set screw 22 are shown and located in FIGS. 2-4. This permits different angular displacement of the shaft 48, with the consequent different angular displacement of the upholstery attached to movable cushion support plate 44. The apertures 90 may also receive adjustable start-stop pins 72.

Figure 3:
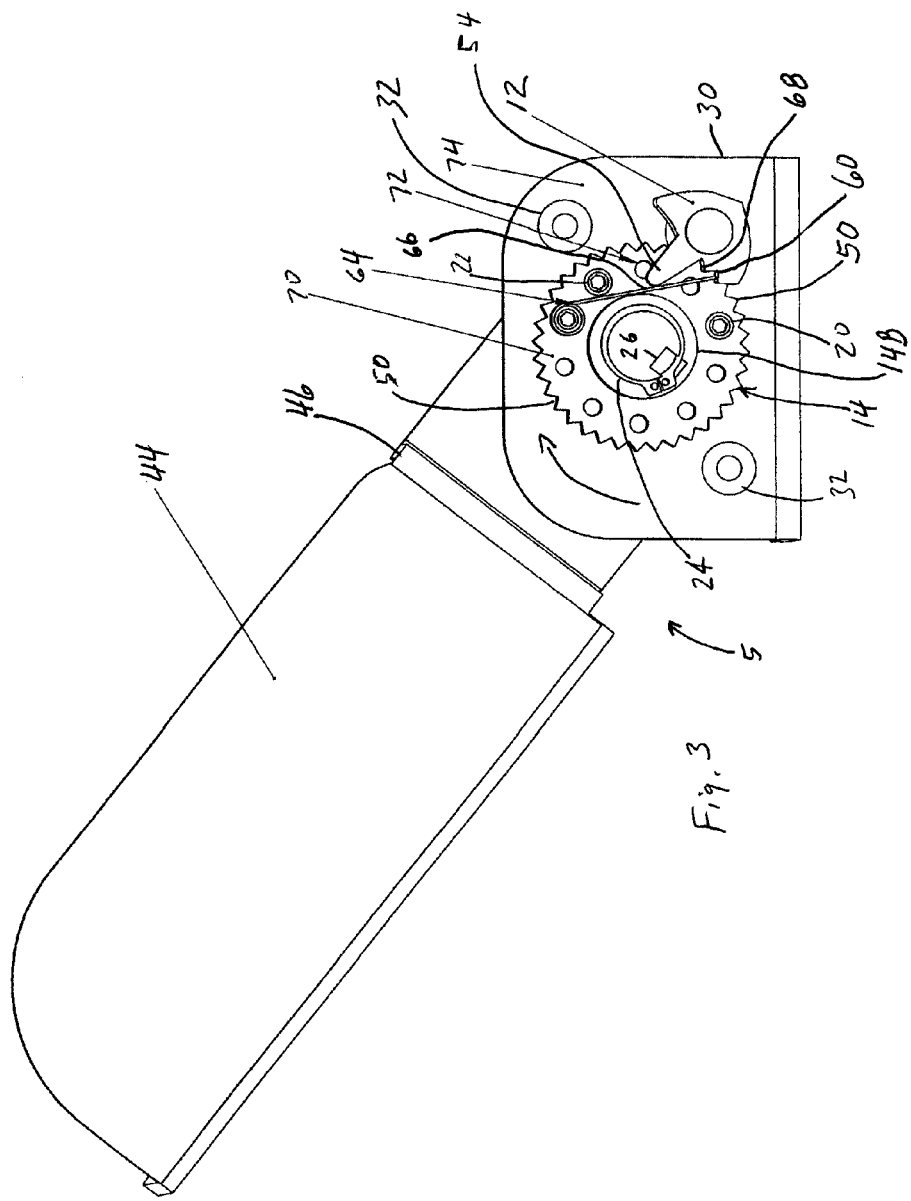
FIG. 3 is a view of the pawl and ratchet spring hinge element of the invention with brackets shown in such a position that if the movable upholstery were shown, it would be at about halfway between it's resting (zero degree) position and it's maximum approximate 97 degree position.

FIG. 3 is a view of the pawl tongue 54, pawl 12 and ratchet spring hinge element 64 of the invention with the cushion support plate 44 shown in such a position that if the movable upholstery were shown, it would be at about halfway between its resting (zero degree) position and its maximum 97 degree position. Since the upholstery is still moving upward, the lower pawl teeth 52 are still shown inter-meshed with a portion of the gear teeth 50 of the main gear 14.

FIG. 3 shows the ratchet spring hinge element 64 in its locked position 66. Further, the lower pawl teeth 52 are shown in their locked position 68. This keeps the backrest in a mid-locked position as shown. The main locking gear 70 is shown interfacing with the pawl 12. The configuration of the following components change as the seat back 76 is moved up and down. These components include the main gear 14, pawl 12, the ratchet spring hinge element 64 and the ratchet spring hinge element extension 64A orientation. This occurs when the upholstery (see FIG. 5) secured to the rear 44A of the cushion support plate 44 is moved to approximately the (42-49) degree position. This is due to the fact that the pawl teeth side 52 has rotated the main gear 14 in 7 degree increments, causing the shaft 48 to rotate approximately 42-49 degrees as well moving the support plate 44. In this position, the lower pawl teeth 52 are still shown inter-meshed with a portion of the gear teeth 50 of the main gear 14.

Figure 4:
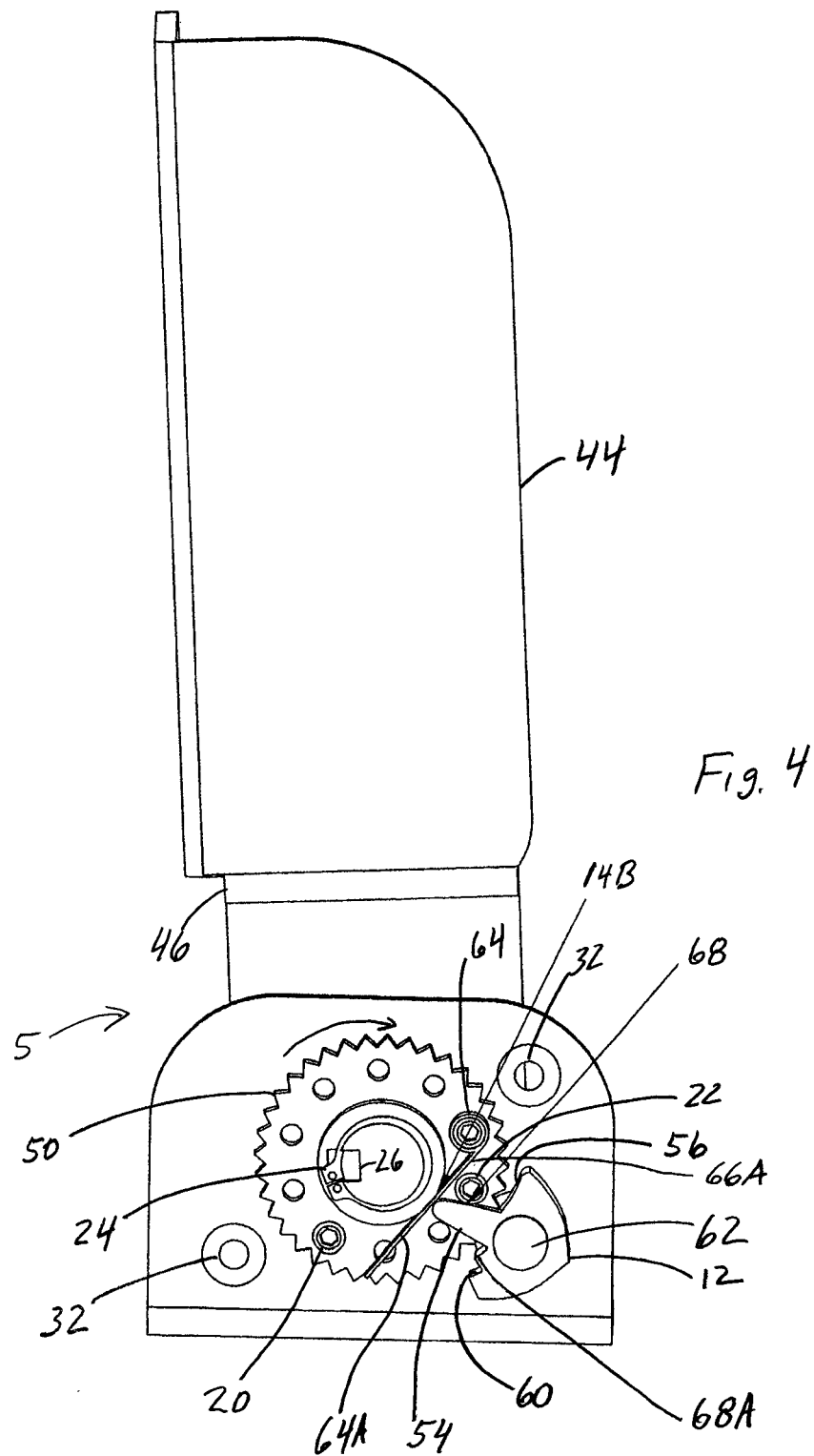
FIG. 4 is a view of the pawl and ratchet spring hinge element of the invention with the brackets shown in such a position that if the movable upholstery were shown, it would be at it's maximum elevation (approximately 97 degrees) with respect to the stern deck.

FIG. 4 is a view of the pawl 12 and ratchet spring hinge element 64 of the invention with the brackets shown in such a position that if the movable upholstery were shown, it would be at its maximum elevation (approximately 97 degrees) with respect to the stern deck. It is at this point where the rotation of the main gear 14 disengages the lower pawl teeth side 52 by rotating the pawl tongue to the left after hitting the second set screw 22. At this point the upper pawl side with no teeth is pushed closest to the gear teeth 50 which permits the main gear 14 and shaft 48 to rotate counterclockwise back to the zero angle position which is shown in FIG. 2. The movement of the pawl tongue 54 along the pawl rotation bearing 62 to engage the pawl teeth 60 with the gear teeth 50 and the subsequent disengagement of the pawl teeth 60 from the gear teeth 50 placing the upper pawl with no teeth 56 allows the pawl teeth 50 and subsequently the shaft 48 for the seat back 76 to rotate freely from the upright position of the 76 or bracket 44 shown in FIG. 4. to the original position of the seat back 76 and bracket 44 in FIG. 2. FIG. 3 shows the ratchet spring hinge element 64 in its released position 66a. Further, the lower pawl teeth 60 are shown in their release position 68a. At this point, the pawl teeth 60 re-engage the gear teeth 50 of the main gear 14 allow the upholstery seat 76 to move upward again at an approximate seven degree increment as the pawl teeth 60 re-engage the gear teeth 50. This allows the backrest to be secured into a comfortable position.

FIG. 5 shows the upholstery seat back 76 being supported in an upright position by a first hinge, ratchets and brackets 10A and a second hinge, ratchet and brackets 10B. Cover element 10 as shown in FIG. 1 encloses the pawl 12, the pawl tongue 54, the main gear 14, and all other interior mechanisms. A portion of fixed mount 30 is shown along with the bend 46 in the cushion support plate 44. The bend 46 in the cushion support plate 44 moves the cushion support plate 44 outwardly from the fixed mount bracket 30 (best seen in FIG. 1) to permit motion of the cushion support plate 44. In FIG. 5 the cushion or movable upholstery 76 is shown in a position which would be actualized by the view of the hinge, ratchets, and brackets shown in FIG. 2. Four apertures 38 (of which only two are shown in FIG. 1) are located on the fixed mount bracket 30 are employed with mechanical fasteners to fix the entire assembly to the stern deck.

FIG. 5 also shows fixed cushion 78 which is also attached to the deck proximal the rear of the boat. Arrow 85 shows the orientation of the movable cushion 76 and fixed cushion 78 with respect to the front of the boat or other craft.

The present invention is a hinge system for a cushion seat back on a boat which may be used for water skiing having a shaft with a first end and a second end, where the shaft first end is connected to a bracket, where the bracket is affixed to a cushion seat back, and the cushion seat back is initially in a flat position at the rear of the boat. The shaft second end is secured by a locking key in a central aperture of a main gear, this main gear having a radius and a circumference, as well as a plurality of teeth equally distributed radially outward about the circumference of the main gear.

A plurality of apertures pass through the main gear, these plurality of apertures are equidistant from one another, and the plurality of apertures are intermediate the central radius of the main gear and the plurality of teeth which radially surround the circumference of the main gear. The hinge system of this invention further includes a pawl with a tongue, where the pawl is rotatably fixed proximal the plurality of teeth, which radially surround the circumference of the main gear. The pawl has a lower portion and an upper portion, and the lower portion has several teeth, while the upper portion has no teeth.

The hinge system of the invention further includes a first set screw and a second set screw, where the first set screw fixed in one of the plurality of apertures above upper portion of the pawl. The second set screw fixed in a second one of the plurality of apertures below lower portion of the pawl. The invention further includes a spring having a body and an elongated tail, where the spring body is fixed in the one of the plurality of apertures above and adjacent the first set screw, and the elongated tail traverses from the spring body to a position above and in contact with the second set screw. In this configuration, the several teeth of the lower portion of the pawl are inter-meshed with an equal number of the plurality of teeth of the main gear and when the cushion seat back is lifted up from it's initially flat position, the shaft rotates the main gear, and several teeth of the pawl are displaced from the equal number of the plurality of teeth of the main gear to a second set of a plurality of teeth on the main gear which locks the seat back at a second position equal to the position where said cushion seat back was lifted up to.

Additionally, when the cushion seat back is lifted up from any position to a position above about 90 degrees, the spring rotates or urges the pawl tongue downward, disengaging the several teeth of the pawl which are inter-meshed with an equal number of the plurality of teeth of the main gear and thus moves the upper portion of the pawl to a position proximal the plurality of the teeth of the main gear, permitting the cushion seat back to be moved back to it's initial flat position.

We claim:

1. A hinge system for a cushion seat back comprising:
   a shaft with a first end and a second end,
   said shaft first end connected to a bracket, said bracket affixed to said cushion seat back,
   said shaft second end secured by a locking key in a central aperture of a main gear, said main gear having a radius and a circumference,
   a plurality of teeth equally distributed radially outward about the circumference,
   a plurality of apertures passing through said main gear, said plurality of apertures equidistant from one another, said plurality of apertures intermediate said central radius and said plurality of teeth,
   a pawl with a tongue, said pawl rotatably fixed proximal said plurality of teeth,
   said pawl having a lower portion and an upper portion, said lower portion having several teeth, said upper portion having no teeth,
   a first set screw and a second set screw, said first set screw fixed in one of said plurality of apertures above said pawl said upper portion,
   said second set screw fixed in a second one of said plurality of apertures below said pawl said lower portion,
   a spring having a body and an elongated tail, said spring body fixed in the one of said plurality of apertures above and adjacent said first set screw, said elongated tail traversing from said spring body to a position above and in contact with said second set screw,
   said pawl several teeth inter-meshed with an equal number of said plurality of teeth whereby when said cushion seat back is lifted up from an initially flat position, said shaft rotates said main gear, and said pawl several teeth are displaced from said equal number of said plurality of teeth to a second set of equal number of said plurality of teeth, locking said seat back at a second position equal to the position where said cushion seat back was lifted up.

2. A hinge system for a cushion seat back as claimed in claim 1 wherein:
   when said cushion seat back is lifted up from any position to a position above about 90 degrees, said spring rotates said pawl tongue downward, disengaging said pawl several teeth inter-meshed with said equal number of said plurality of teeth and moving said pawl upper portion to a position proximal said plurality of said plurality of teeth of said main gear, unlocking said seat back and permitting said seat back to be returned to said initial flat position.

* * * * *